Figures 1, 2:
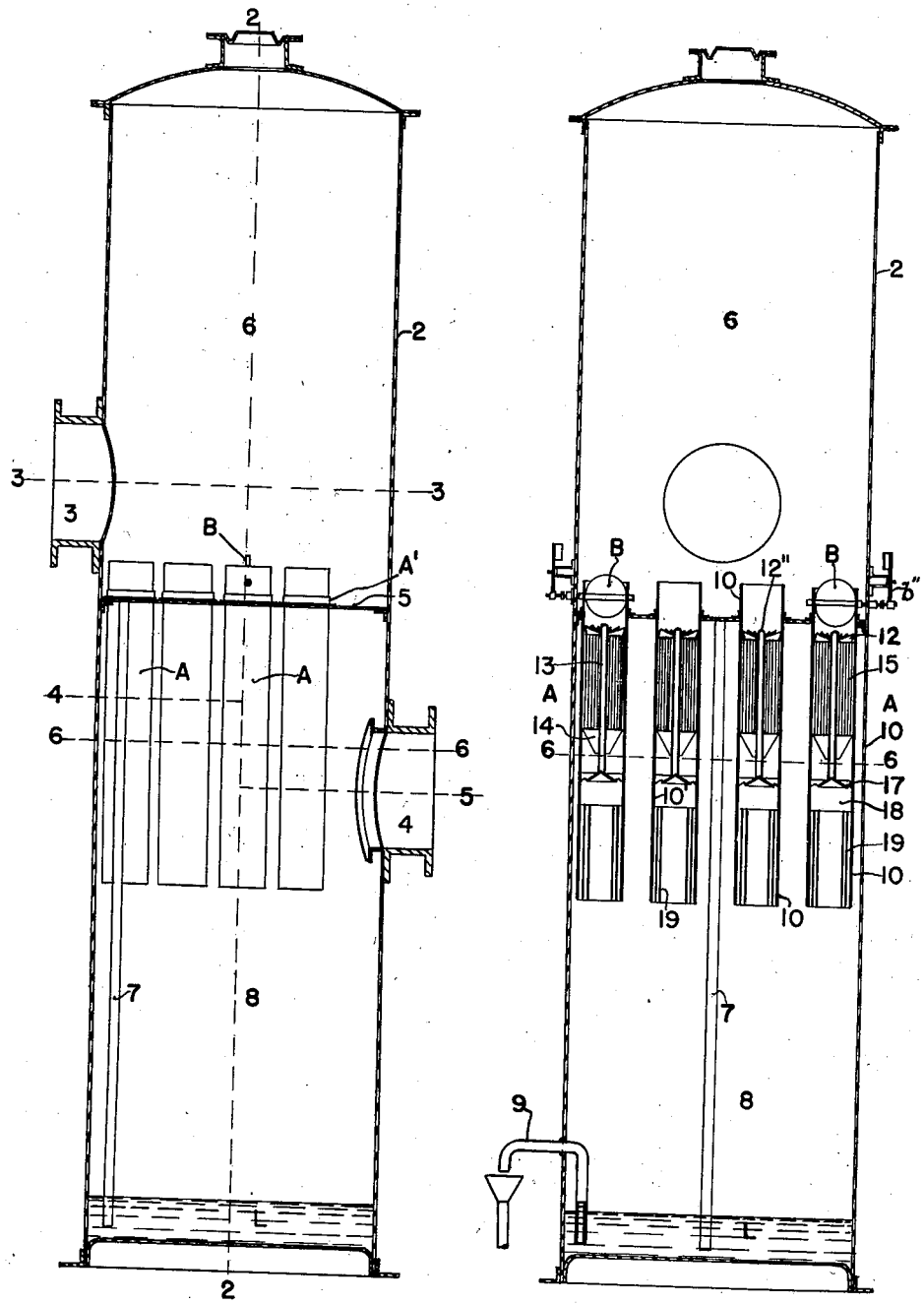

Oct. 1, 1940.　　　C. G. HAWLEY　　　2,216,390
TAR EXTRACTOR
Filed March 16, 1938　　　3 Sheets-Sheet 1

INVENTOR
CHARLES G. HAWLEY
BY Mason & Mason
ATTORNEYS

Oct. 1, 1940.  C. G. HAWLEY  2,216,390

TAR EXTRACTOR

Filed March 16, 1938  3 Sheets-Sheet 2

INVENTOR
CHARLES G. HAWLEY
BY Mason & Mason
ATTORNEYS

Oct. 1, 1940.    C. G. HAWLEY    2,216,390
TAR EXTRACTOR
Filed March 16, 1938    3 Sheets-Sheet 3
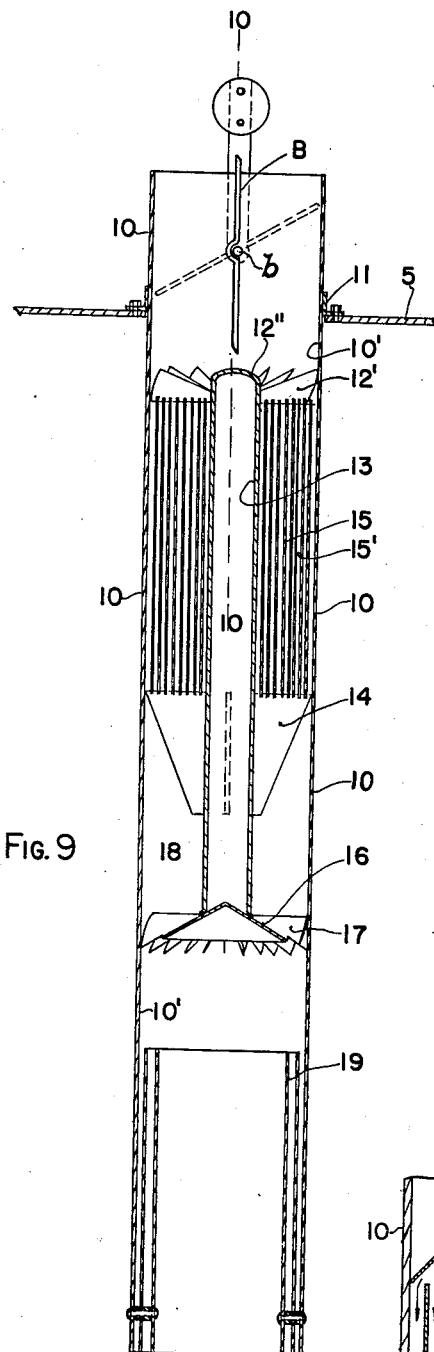
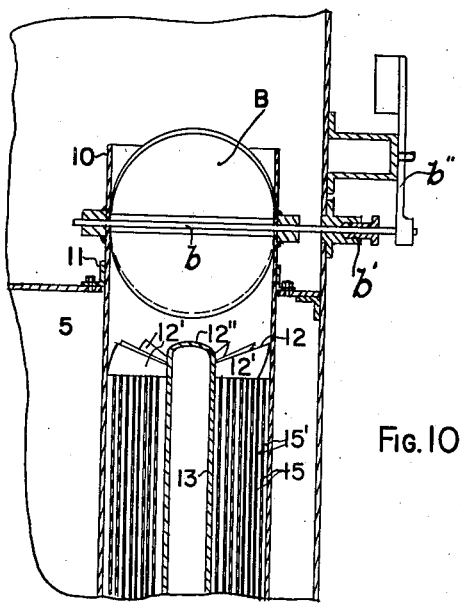
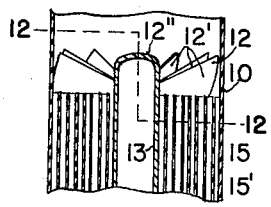
Fig. 10
Fig. 11
Fig. 12
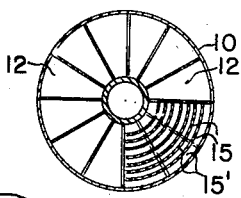
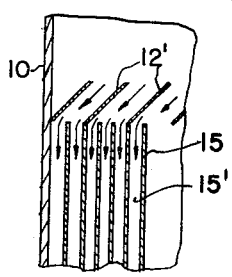
Fig. 13
INVENTOR
CHARLES G. HAWLEY
BY Mason & Mason
ATTORNEYS Patented Oct. 1, 1940

2,216,390

UNITED STATES PATENT OFFICE 2,216,390

TAR EXTRACTOR

Charles Gilbert Hawley, Cleveland, Ohio, assignor to Centrifix Corporation, Cleveland, Ohio, a corporation of Ohio Application March 16, 1938, Serial No. 196,300

2 Claims. (Cl. 183—75)

This present invention and application incorporates the process which was first described in my pending application S. N. 22,252 of May 18, 1935, and also comprises certain improvements of apparatus which extend the usefulness of that invention.

Air, gases and vapors are moved through pipes or conduits in both hot and cold conditions and many such streams are burdened or fogged with minute particles of liquid or with vapors which become liquid when condensed. The burden or fog should be removed before the air, steam, fixed gas, or, vapor is devoted to its intended use; and, such is the purpose or object of the present invention.

A most difficult problem is presented when the purification of manufactured gas is attempted, particularly when the temperature thereof has been reduced to a point which causes the contained tar to assume a liquid state, finely subdivided.

By way of example, the following description will be directed to the particular use and adaptation of the invention as a tar fog extractor. Such description will serve to disclose the details of the invention, in various desirable forms, and, will make it plain that the invention is not restricted to that one use but is of broad utility in the purification of various aeriform fluids which are in a state of swift movement, as within conduits or pipes.

Whatever the nature of the aeriform fluid to be treated it will be spoken of as "gas" and the herein used word "tar" is to be taken as standing for the comminuted matters to be intercepted and removed. Dusts are likewise included, particularly when associated with liquid sprays or particles.

By preference and to both ensure and enable very efficient purification of great volumes of gas, the invention is constructed in multiple form. That is, the apparatus is made up of a number of identical units, all deriving gas from an inlet main or header, and all delivering purified gas to a departure main, usually leading into a gasometer.

Specifically, a plurality of extractor units are combined in and with a vertical gas chamber or tower which is divided into gas reception and gas exit chambers, which the extractor units serve to connect.

Each said unit comprises a single piece of apparatus wherein centrifugal forces are made to accomplish first an agglomeration and then a final segregation or separation of the tar or like comminuted matter, thus conditioning the gas for safe and satisfactory use.

Except for valves employed to cut certain units in and out of service, no part of this apparatus is movable or is rotative and no power is required except that which is needed to move the gas through the apparatus.

Each extractor unit is wholly composed of fixed parts, arranged to direct the passing gas into vertical movements which, assisted by the presence of impact or collecting surfaces, bring about a truly centrifugal purification of the gas.

Specifically, an important element of each unit comprises the upper part of aforesaid tower wherein the entering gas is permitted to greatly expand, the better to deposit condensible matters. Having expanded, the gas is next subdivided within a plurality of said units, passing thence downward into the gas exit chamber in the lower part of the tower.

In each said unit gas is set into rotation about the unit axis and is subdivided into a plurality of thin downward moving gas streams, each in vertical or whirling movement about said axis of the unit and under the restraint of said means.

The gas subdividing means referred to comprise extensive vertically cylindrical and concentric spaced surfaces, through each of which cylindrical shapes and spaces the gas proceeds spirally downward in an axial direction. Due to the centrifugal forces evolved, the minute particles of tar contained by the gas are caused to impact the described surfaces and by reason of relative surface tensions momentarily adhere thereto, forming thin layers or films which do not interfere with the downward and outward passage of the gas.

As will be apparent, the tar forms into films or agglomerations upon such impact surfaces and due to the thrust of the gas stream and to the force of gravity is delivered to the lower edges of the cylindrical surfaces referred to. Having been thus gathered, the tar leaves such lower edges in the direction of gas flow and in the form of drops and thread-like masses which can be readily separated from the departing gas and which have little, if any, tendency to become re-entrained therein.

To defeat possibility of re-entrainment, the falling tar masses are collected in liquid form in the bottom or exit chamber of the tower, thence to be discharged as a side stream from the tower and permitting the gas to leave the tower in purified condition.

As will appear, it is both profitable and convenient to duplicate the described tar massing or agglomerating parts in the lower part of each tar extracting unit.

In practice, the gas passes through the described tower and the contained units at very high velocity. Its period of retention within the tower is limited to a mere part of a second and yet a very perfect aggregation and separation of tar is reliably accomplished.

In the case of the tar fogs of artificial gases a further pronounced effect is accomplished, to wit: The oily tar as it clings to and flows upon the internal surfaces of the described unit serves to extrude therefrom both mineral and water particles; and, such particles being thus exposed are almost completely carried away by the otherwise purified gas; for easy disposition in the gasometer. The collected tar is of high order and value, being almost entirely free from water and ash particles.

Still further features and details of the invention as best constructed and practiced will be explained hereinafter.

Figure 3:
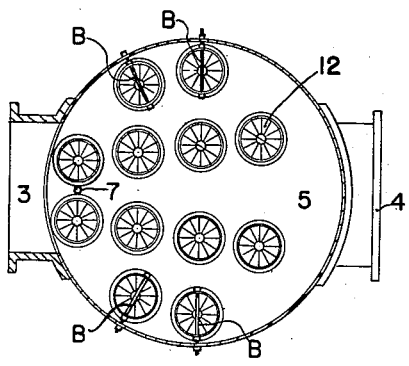
Figure 4:
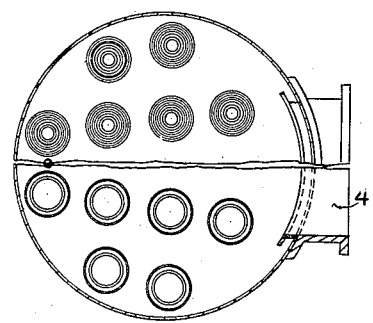
Figure 7:
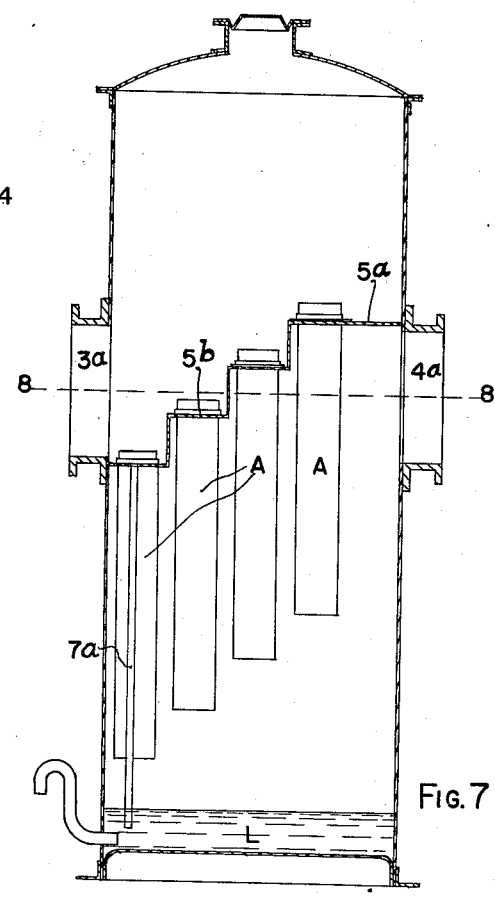
Figure 6:
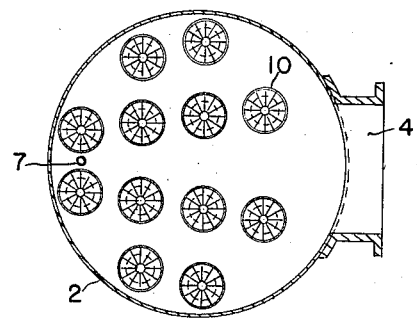
Figure 8:
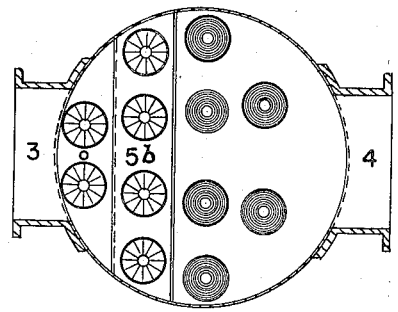

The invention in its entirety will be readily understood upon reference to the accompanying drawings; in which, Fig. 1 is a vertical section of a tar extractor embodying the invention; Fig. 2 is a vertical section on the line 2—2 of Fig. 1; Fig. 3 is a cross section on the line 3—3 of Fig. 1; Fig. 4 is a partial cross section on the line 4— of Fig. 1; Fig. 5 is a partial cross section on the line —5 of Fig. 1; Fig. 6 is a cross section upon the line 6—6 of Fig. 1 or Fig. 2; Fig. 7 is a vertical section illustrating a modified arrangement of the extractor units within the tower or casing and permitting gas to enter and leave the tower at the same level; Fig. 8 is a horizontal section on the line 8—8 of Fig. 7; Fig. 9 is an enlarged vertical section of one of the described tar extractor units; Fig. 10 is a sectional view substantially on the line 10—10 of Fig. 9; Fig. 11 is a fragmentary section individually disclosing the whirl-promoting tuyère which coacts with the nest of fixed cylindrical impact elements; Fig. 12 is a sectional view substantially upon the irregular line 12—12 of Fig. 11; and, Fig. 13 is an enlarged sectional detail illustrating the angular relation of the whirl-promoting tuyère blades and the underlying impact elements.

The basic process comprehended by this invention as above described is here practiced within a tall casing or tower 2, closed at top and bottom and having an inlet 3 in one side and an outlet 4 in the other side, aided by novel extractor units marked A, which are assembled within the tower, operatively between said inlet and said outlet. The unit construction will be explained.

The tower 2 is divided into an upper chamber 6 and a lower chamber 8 by a floor or horizontal partition 5 and the extractor units A are supported by that floor, serving as vertical conduits through which the gas from the upper chamber 6 descends into the lower chamber 8.

As will be better explained, and, as illustrated in Figs. 3 to 8, the units are disposed in rows which in plan view approximately radiate from the position of the inlet 3, allowing maximum space beneath the floor for the exit of purified gas through the outlet 4.

In practice, the number of such units A to be employed is determined by the total volume of gas to be treated, the individual units being of relatively small gas capacity. The height of the tower and its diameter and the number of units employed therein vary with the total quantity of gas to be treated. In every case several units are used in a single tower.

The units are identical and preferably are of the construction detailed in Figs. 9 to 13. It is best to employ in the tower 2 enough such units to care for a maximum flow of gas and to reduce the number in operation when the total flow is reduced. Hereunder such reduction is accomplished by means of dampers or butterfly valves B, which are installed in the tops of several of the units A and constructed to be worked from the exterior of the tower.

As will appear, these units are capable of efficient operation within a wide range of gas flow but to attain the best results each unit should be operated at the middle range, hence the provision of the valves or dampers B, shown.

The units A are not of highest efficiency if operated at low rates and if used at excessive rates develop back pressures that are objectionable from the standpoint of the power ordinarily employed to propel the gas in the gas mains and through the tower 2. The difficulty is here overcome by opening or closing several of the units to distribute and limit the gas flow to that number of units required to give the best results at the established flow.

The foregoing statements make clear all of the essentials pertaining to the construction and operation of the tar extracting tower. However, it is desired to present all essentials in the best forms thus far devised and therefore attention is directed to further details and operations, as follows:

The large chamber 6 above the floor 5 is referred to and functions as an expansion space. Therein the gas which enters through the inlet 3 is allowed to momentarily expand and thus the precipitation of much liquid matter is accomplished. Much of that liquid passes downward through the units A and is therein cared for, the rest falls upon the floor 5 and drains away through the down pipe or drain 7, the open lower end of which is sealed within liquid L, accumulated in the bottom of the gas exit space 8. The part 9 represents a tar discharge pipe leading from the bottom of the tower and constructed to prevent loss of gas.

Only the open tops of the units A appear above the floor 5. In the main, the units A hang within the upper part of the exit space 8. They are supported by collars A' which rest on the floor 5 and may be lifted bodily through respective openings in the floor 5.

The lower ends of the extractor units A open downward into the large chamber 8. It will now be understood that the extractor units A serve as gas channels which connect the upper and lower gas chambers, and as already explained, the purified gas leaves the tower chamber 8 through the outlet 4.

Each extractor unit A, as about to be described, contains parts which serve to temporarily retain and agglomerate tar particles from the passing gas; and the tar descends with the gas from the open lower ends of said units; the tar and tar oil being presented in the form of drops and masses which quickly fall to the bottom of the chamber 8, being too heavy to be carried away by the departing gas.

The gas extracting tower here shown contains twelve of the described cylindrical extractor units and if these were conventionally or symmetrically arranged in the floor 5 a difficulty would be presented in that the outflow of gas through the outlet 4 would be limited and obstructed with consequent loss of gas pressure as measured between the inlet and the outlet of the tower. It is particularly desirable that such loss be minimized and this is accomplished by the above described radial disposition of the many units.

The units are symmetrically disposed with reference to the middle vertical plane of the tower which includes inlet 3 and outlet 4, but are not symmetrically disposed with reference to the axis of the tower. Two rows of four units each, starting close together adjacent the inlet 3, diverge as they approach the position of the outlet 4. Two outer rows of two units each likewise radiate from a distant center upon the inlet side of the tower. Necessarily the units are quite closely spaced in the described and illustrated rows but as made apparent by the drawings, the actual gas passages through which the departing gas approaches the outlet 4 widen toward that outlet and thus allow the virtually unobstructed departure of the gas.

The individual extractor units A offer little resistance of the passage of the gas and by arranging the units as here described it becomes possible to pass gas through the tower with a total pressure drop which is so low as to be negligible. The force used to move the gas from the manufacturing plant to the described tower is adequate to force the gas through the tower and no additional expenditure of power is required by reason of the use of this tar extractor; a matter of much practical importance.

The gas inlet and outlet of the tower illustrated in Fig. 1 are at different levels, a usual requirement; but in some cases it is more convenient to construct the tower in manner to be "cut" into a straight gas main. In such a case the tower is provided with a stepped floor 5a, having lands 5b which are broad enough to accommodate the extractor units A. This arrangement is made possible by the described spacing of the units.

Liquid which falls upon the stair-like floor flows downward and is discharged through the drain 7a. Obviously, this arrangement of the units A permits the inlet 3a and the outlet 4a at the same level and in alignment.

The construction of each unit A is well illustrated in Fig. 2 but is best shown in Figs. 9 to 13, to which attention is now directed.

Each vertical unit A is characterized by a cylindrical shell 10, which is open at both top and bottom. Near its top the shell 10 carries a circumferential supporting collar 11, normally at rest on the floor 5. As shown, the short upper end of the cylinder 10 rises above the floor 5, far enough to conveniently contain a damper B. In those units which contain dampers the damper shaft b extends through the adjacent wall portions of the tower. Packing boxes b' are there provided and upon the external end of each shaft b is a weighted operating lever b", normally in open position. To close a damper B it is only necessary to release the lever b".

Completely tight valves are not here required; and, these dampers serve all shut-off purposes, being virtually pressure-free within the low pressure gas space.

Within the upper part of the shell 10, below the damper position therein, is a radially bladed so-called whirl-promoting tuyère 12. The radial blades 12' are inclined and are all of the same inclination; surrounding the central hub portion 12". The inner ends of the blades are welded or otherwise rigidly attached to the hub portion 12" and are also rigidly attached to the inner wall 10' of the shell 10.

A central tube 13 forms a downward continuation of the hub portion 12" and serves purposes which will be explained; and one of which is to carry the radially disposed upright brackets 14. Those brackets support a plurality of concentric thin walled cylinders 15, uniformly spaced.

The tops of the brackets 14 are notched to receive and so space the many cylindrical shapes 15. Some of the blades 12' may be similarly notched to receive and space the upper ends of the cylinders 15.

In practice, the space 15' between adjacent concentric cylinders 15 is wider than the thickness of the tar film or layer which will form upon the surfaces thereof, as hereinafter explained. A spacing of three-eighths to one-half inch has been found both practical and desirable and definitely obviates capillary retention of liquid between adjacent concentric cylinders. And importantly, such spacing of the cylinders affords ample room for the downward passage of the gas, so that the pressure drop through the group or nest of cylinders is negligible.

As will be clear, the diameter of the shell 10 is relatively small and the diameters of the cylinders 15 composing what is termed the impact nest, are successively smaller. The gas moving downward from the top of the shell first encounters the so-called radial tuyère 12; and being whirlingly deflected thereby is angularly or spirally directed into the many spaces between the cylinders 15. The total area available within the spaces 15' is greater than the available area between the inclined blades of the tuyère 12. Therefore, the downward whirling motion of the gas is not suppressed within the impact nest. As a result of such whirling motion within each cylinder, the minute liquid particles, like those composing tar fog, are centrifugally deposited upon the internal surface of each cylinder composing the nest of cylinders.

By reason of differing surface tensions the liquid is tenaciously retained by those surfaces, thereon forming into thin layers or films; which, yielding to the downward urge of the moving gas, spiral downward until the lower edges of the cylinders 15 are reached. There, and again as a result of surface tension, the liquid forms into large drops and masses of sufficient size to be detached from said edges by gravity and to descend through the shell along with the downgoing gas.

As will be apparent, the masses of tar and tar oil thus brought together resist pulverization and re-entrainment by the swiftly moving gas and being mainly thrown against the lower inner wall of the shell 10 flow downward until the lower end of the shell is reached, dropping thence into the bottom of the tower.

It is both convenient and desirable to repeat the tar agglomerating operation above described and to that end, the lower end of the central stem 13 is provided with a spreader plate or cone 16 and another set of inclined radial blades 17. The gas leaves the space 18 only to meet the blades 17 and to be again set into vigorous rotation, which rotation definitely accomplishes the deposition of the liquid masses upon the lower inner wall 10' of the shell.

For still greater certainty another set of centrifugal impact receiving cylinders 19, like the cylinders 15 but more generously spaced, are provided in the lower part of the shell, for large liquid drops and masses must be accommodated by them, and also a small residue of minute particles, which might otherwise remain in suspension in the outgoing gas.

The progress of the described process, its effects and the complete construction and operation of this apparatus have all been made plain in the foregoing and therefore do not require summarization or repetition herein.

I claim:

1. The herein described apparatus for extracting liquid particles from gas burdened therewith, comprising a casing provided with a gas admission space in its upper portion having a gas admission opening communicating therewith, and a gas exit space below said gas admission space, with a gas exit opening in communication therewith, a plurality of vertically arranged tubes located intermediate said gas admission and gas exit spaces, each of said tubes being open at the top and bottom and containing a plurality of concentric cylindrical liquid collecting surfaces, and at the top thereof having a liquid and gas whirling tuyère, said liquid collecting surfaces providing an avenue for the movement of gas and liquid from the gas admission space to the gas exit space in said casing, said casing being provided at its bottom portion with means for collecting liquid and for the discharge thereof, said tubes being arranged in rows within the casing which radiate from the gas admission opening to the gas exit opening in said casing.

2. The herein described apparatus for extracting liquid particles from gas burdened therewith, comprising a casing provided with a gas admission space in its upper portion having a gas admission opening communicating therewith, and a gas exit space below said gas admission space, with a gas exit opening in communication therewith, a plurality of vertically arranged tubes each containing gas and liquid separating means located intermediate said gas admission and gas exit spaces, each of said tubes being open at the top and bottom, said casing being provided at its bottom portion with means for collecting liquid and for the discharge thereof, said tubes being arranged in rows within the casing which radiate from the gas admission opening to the gas exit opening in said casing.

CHARLES GILBERT HAWLEY.